Figure 1:
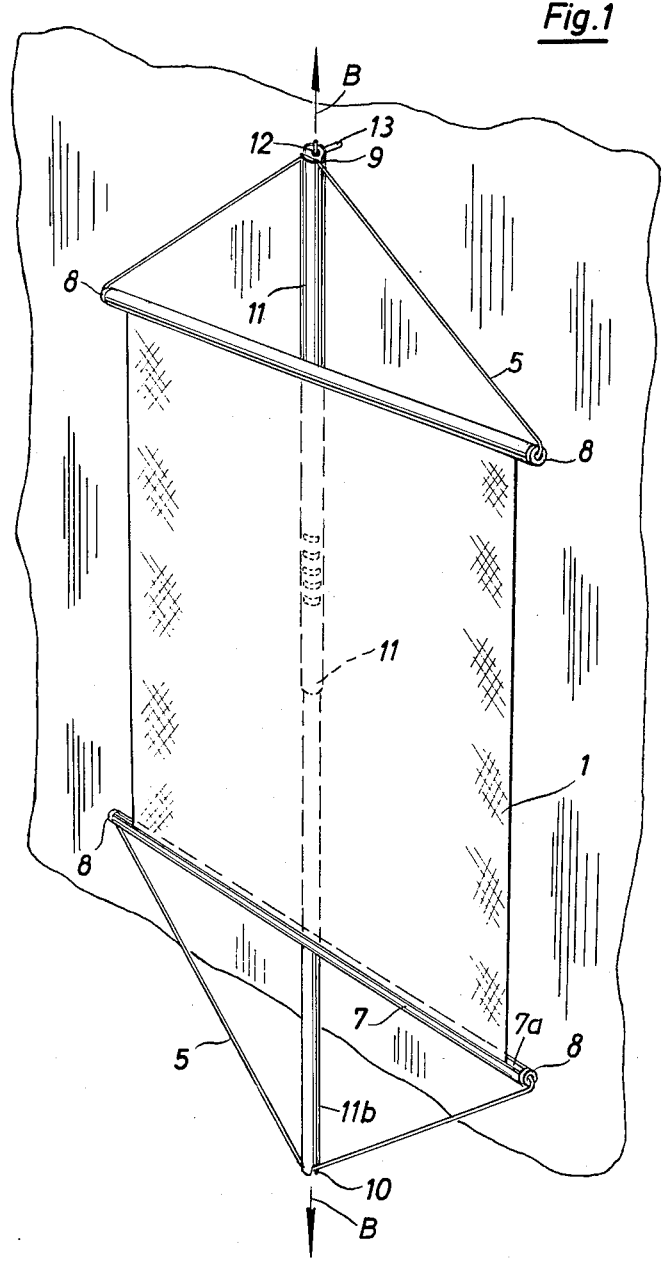

Aug. 7, 1962   F. WAGNER ET AL   3,048,220
SUSPENSION ARRANGEMENT
Filed Jan. 20, 1960   2 Sheets-Sheet 1

INVENTOR.
FERDINAND WAGNER
HANS-ADO BRANDT
HERMANN MÜLLER
BY

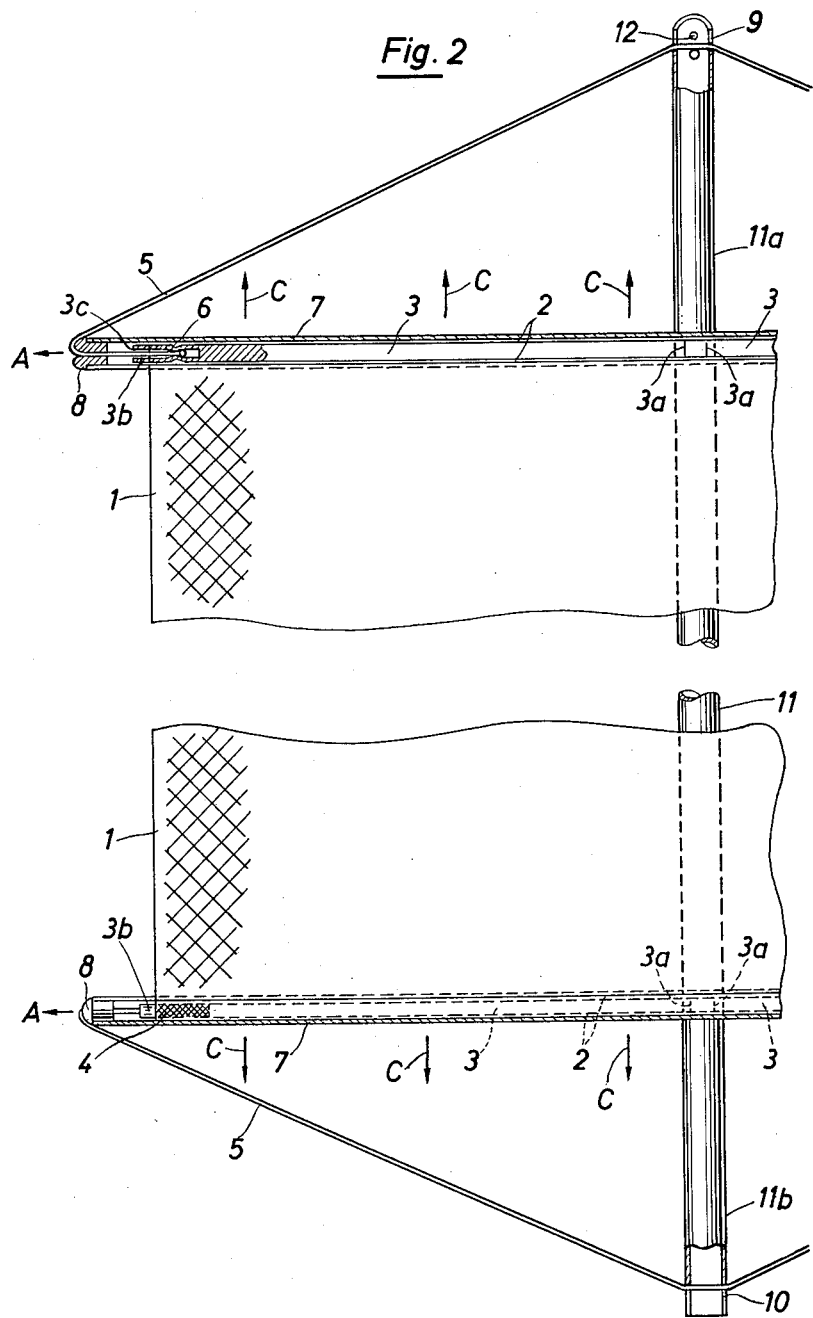

3,048,220
SUSPENSION ARRANGEMENT
Ferdinand Wagner, Hans-Ado Brandt, and Hermann Müller, Munich, Germany, assignors to Agfa Aktiengesellschaft, Leverkusen-Bayerwerk, Germany
Filed Jan. 20, 1960, Ser. No. 3,569
Claims priority, application Germany Jan. 22, 1959
9 Claims. (Cl. 160—328)

The present invention relates to a suspension arrangement.

More particularly, the present invention relates to a suspension arrangement for a projection screen which has tubular pockets along opposite edges.

There exist projection screens whose edges are formed with tubular pockets, these screens being supported by a frame and kept taut by means of springs or ropes. The parts which are necessary to accomplish this are unsightly, are awkward to erect and collapse, incorporate a large number of individual elements, are heavy, and are expensive to manufacture.

Other types of known screens dispense with maintaining the screen taut either in longitudinal or in transverse direction, and they have been found to form an unsatisfactory projection surface, particularly when the screen is made of plastics which are sensitive to temperature changes. Other screens, in which the screen body proper is adhesively secured to the end supports throughout the entire length of the edges, are likewise not satisfactory because even if they are manufactured with great precision, the screen will sooner or later acquire folds or creases.

It is therefore an object of the present invention to provide a suspension arrangement for a projection screen which holds the screen taut and free of folds.

It is another object of the present invention to provide a suspension arrangement for a projection screen which is extremely simple, incorporates few parts, can readily be mass-produced at low cost, and which can easily be erected and collapsed.

The objects of the present invention also include the provision of a suspension arrangement for a screen which can be made very light so that the screen can easily be carried from place to place.

With the above objects in view, the present invention mainly resides in a suspension arrangement for a projection screen which has tubular pockets along opposite edges, which suspension arrangement comprises two pairs of elongated support members, the two support members of each pair not being rigidly connected with each other and passing through one corresponding pocket, the screen being attached to each of the four support members only in the region of the outer end portions thereof, two tubular members each encompassing one corresponding pocket and the two support members arranged therein, each tubular member being longer than each pocket and the two support members arranged therein and being formed with an elongated slot through which the screen passes, and means for applying an outwardly directed axial force to each of the support members.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective view of a suspension arrangement according to the present invention; and FIG. 2 is sectional view, on an enlarged scale, of the suspension arrangement shown in FIG. 1.

Referring now to the drawings, there is shown a projection screen 1 which is made in conventional manner of any suitable material, such as textile or plastic material. The screen is formed along opposite edges with elongated tubular pockets whose edges, in the section plane of FIG. 2, are indicated at 2. These pockets can be formed by sewing, glueing, or fusing.

Each pocket has arranged within it two elongated support rods 3 which are not rigidly connected to each other; in the illustrated embodiment they are shown as being completely separate rods which are not connected to each other in any manner. These rods, which are made of wood, metal, plastic or any other suitable material, are slid into the pockets and each rod extends throughout approximately half the length of the respective pocket, so that a free space is formed between the inner ends 3a of the rods.

The screen 1 is connected to each of the four rods 3 only in the region of the outer end portions 3b thereof, such as by an adhesive 4.

Also provided are two elongated tubular members or aligning means 7, made of metal, plastic, hard cardboard or other suitable material, each of which members 7 encompasses one corresponding pocket 2, and the two rods 3 contained therein, with slight clearance. Each member 7 is longer than the sum of the lengths of the two rods arranged in the pocket which each respective member 7 encompasses; if both rods 3 are of the same length then the member 7 is more than twice the length of each rod. The ends of each tubular member 7 are provided with closure members or caps 8.

The members 7 are formed with elongated slots 7a through which the screen 1 passes. These slots 7a are but slightly wider than the thickness of the screen.

According to the present invention, means are provided for applying an outwardly direct axial force to each of the support members, i.e., a force acting in the direction of the arrows A. Furthermore, a force is applied to the tubular members 7 which urges them apart, thereby tensioning the screen, and this force is transverse to the force A and acts in the direction indicated by the arrows B. These means comprise two cables 5 whose ends pass freely, i.e., with little friction, through the caps 8 in the ends of the tubular members 7 and are attached to the outer ends 3b of the rods 3. These cables, which are made of a material of low elasticity such as metal or an appropriate plastic, have their ends received in a slot 3c of the outer end portions 3b of the rod 3, and are held in place by a crimp 6.

The mid section of the cables are supported by an elongated support 11 which extends in the direction of the length of the screen and has end portions 11a, 11b that project beyond the pockets 2 of the screen. As is shown in the drawings, the mid portions of the cables 5 are attached to the support 11 by passing through eyes 9, 10 that are located at a point beyond the corresponding pocket 2. In this way, the tensioning force is distributed evenly throughout the entire width of the screen, as indicated by the arrows C.

In order to facilitate tensioning of the screen, the support 11 may be constituted by a telescoping rod whose individual sections can be fixed to each other in any desired position. Also, each end portion 11a, 11b of the support may carry a number of spaced hooks or eyes for the cables 5; if desired, the support 11 may be equipped with one or more slidable hooks which can be moved along the length of the support 11 and be held in place at any desired point, or a suitable adjustable tensioning device may be provided.

In order to hang up the entire suspension arrangement, the support 11 is formed at its uppermost end portion with an opening 12 through which passes a hook 13 attached to a wall 14.

In the illustrated embodiment it is the upper and lower edges which are shown as being formed with pockets, i.e., the pockets are oriented horizontally and the support 11 is arranged vertically. It will be understood, however, that the entire arrangement may be turned 90° so that the support 11 is horizontal, whereupon the structure may be suspended or supported in any appropriate manner.

It will be seen from the above, particularly upon inspection of FIG. 1, that the suspended screen by using but few parts has a pleasing appearance which is quite similar to that of existing suspended screens in which the screen is tensioned in one direction only, whereas the screen according to the present invention is tensioned in both directions.

It will be understood that each of the elements described above, or two or more together, may also find a useful application in other types of suspension arrangements differing from the types described above.

While the invention has been illustrated and described as embodied in a suspension arrangement for a projection screen, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A suspension arrangement for a projection screen which has tubular pockets along opposite edges, said suspension arrangement comprising, in combination: two pairs of elongated support members, the two support members of each pair passing through one corresponding pocket substantially aligned in longitudinal direction and movable away from each other, said screen being attached to each of the four support members only in the region of the outer end portions thereof; two tubular members each encompassing one corresponding pocket and the two support members arranged therein, each tubular member being formed with an elongated slot through which the screen passes; and means operatively connected to said support members and said tubular members for applying to said tubular members a force in direction transverse to their elongation for urging said tubular members away from each other so as to tension said screen in longitudinal direction and for translating the tension force applied to said screen in longitudinal direction onto said support members to apply axially directed forces on said support members tending to move the support members in each pair away from each other so as to tension said screen in transverse direction.

2. A suspension arrangement for a projection screen which has tubular pockets along opposite edges, said suspension arrangement comprising, in combination: two pairs of elongated support members, the two support members of each pair passing through one corresponding pocket substantially aligned in longitudinal direction and movable away from each other and having a total length approximately equal to the length of the pocket within which they are arranged, said screen being attached to each of the four support members only in the region of the outer end portions thereof; two tubular members each encompassing one corresponding pocket and the two support members arranged therein with but little clearance, each tubular member being longer than each pocket and the two support members arranged therein and being formed with an elongated slot through which the screen passes, said slot being but slightly wider than the thickness of said screen; and means operatively connected to said support members and said tubular members for applying to said tubular members a force in direction transverse to their elongation for urging said tubular members away from each other so as to tension said screen in longitudinal direction and for translating the tension force applied to said screen in longitudinal direction onto said support members to apply axially directed forces on said support members tending to move the support members in each pair away from each other so as to tension said screen in transverse direction.

3. A suspension arrangement for a projection screen which has tubular pockets along opposite edges, said suspension arrangement comprising, in combination: two pairs of elongated support rods, the two rods of each pair passing through one corresponding pocket, said screen being attached to each of the four rods only in the region of the outer end portions thereof; two tubular members each encompassing one corresponding pocket and the two rods arranged therein with but little clearance substantially aligned in longitudinal direction and movable away from each other, each tubular member being longer than the sum of the length of the two rods arranged in the pocket which each respective tubular member encompasses and being formed with an elongated slot through which the screen passes, said slot being but slightly wider than the thickness of said screen; and means operatively connected to said support rods and said tubular members for applying to said tubular members a force in direction transverse to their elongation for urging said tubular members away from each other so as to tension said screen in longitudinal direction and for translating the tension force applied to said screen in longitudinal direction onto said support rods to apply axially directed forces on said support rods tending to move the support rods in each pair away from each other so as to tension said screen in transverse direction, said means comprising cable means having ends passing freely through the ends of said tubular members and being attached to the outer ends of said rods.

4. A suspension arrangement as defined in claim 3 wherein each of said tubular members carries at its opposite ends a closure member formed with a bore therethrough through which said ends of said cable means freely pass.

5. A suspension arrangement as defined in claim 3 wherein said means also constitute means for suspending the tensioned screen.

6. A suspension arrangement for a projection screen which has tubular pockets along opposite edges, said suspension arrangement comprising, in combination: two pairs of elongated support rods, the two rods of each pair passing through one corresponding pocket, said screen being attached to each of the four rods only in the region of the outer end portions thereof; two tubular members each encompassing one corresponding pocket and the two rods arranged therein with but little clearance, each tubular member being longer than the sum of the length of the two rods arranged in the pocket which each respective tubular member encompasses and being formed with an elongated slot through which the screen passes, said slot being but slightly wider than the thickness of said screen; and means for applying an outwardly directed axial force to each of the four rods and for applying a force to said tubular members which urges them apart, thereby tensioning the screen, said means comprising an elongated support which extends in the direction of the length of the screen and has end portions that project beyond said pockets, and two cables each having two ends which pass freely through the ends of one of said tubular members and are attached to the outer ends of the rods arranged therein and a mid portion attached to said elongated support at a point beyond the corresponding pocket.

7. A suspension arrangement as defined in claim 6 wherein said cables are made of a material of low elasticity.

8. A suspension arrangement as defined in claim 6 wherein said elongated support is constituted by a telescoping rod.

9. A suspension arrangement for a screen having two opposite transverse edges, said suspension arrangement comprising, in combination, a pair of elongated separate support members connected to each of said opposite transverse edges in substantial alignment therewith and fixed thereto against displacement in longitudinal direction of said edges only in the region of the outer end portions thereof; a rigid elongated aligning means associated with each pair of support members for keeping the same in substantial alignment while permitting movement thereof in longitudinal direction; and means operatively connected to said support members and said aligning means for applying to said aligning means a force in direction transverse to their elongation for urging said elongated aligning means away from each other so as to tension said screen in longitudinal direction and for translating the tension force applied to said screen in longitudinal direction onto said support members to apply axially directed forces on said support members tending to move the support members in each pair of support members away from each other so as to tension said screen in transverse direction.

References Cited in the file of this patent

UNITED STATES PATENTS

| | | |
|---|---|---|
| 1,918,073 | Williams et al. | July 11, 1933 |
| 2,922,471 | Nicholas | Jan. 26, 1960 |